United States Patent Office 3,567,426
Patented Mar. 2, 1971

3,567,426
DIRECT IRON ORE REDUCTION PROCESSES
Marnell A. Segura, Baton Rouge, and Leo Broussard, Parish, La., assignors to Esso Research and Engineering Company
No Drawing. Filed Apr. 29, 1968, Ser. No. 725,137
Int. Cl. C21b 1/06
U.S. Cl. 75—1                                6 Claims

ABSTRACT OF THE DISCLOSURE

This invention relates to a process for increasing the iron values of wustite products by disproportionation of wustite at relatively mild conditions. In particular, the free metal content of wustite-containing reduced iron products can be increased by providing sufficient holding time, at relatively low temperatures, ranging generally from about 500° F. to about 1000° F. to produce disproportionation of wustite to magnetite and metallic iron. The iron content of products from direct iron ore reduction processes containing residual wustite can be readily increased by heat treatment or controlled cooling at times sufficient to disproportionate the wustite to iron metal and magnetite.

---

The production of metallic iron by direct reduction of oxidic iron ores, or precursors thereof at temperatures ranging from about 1000° F. up to the sintering temperature of the ore, generally about 1800° F., is well known to the art. In fluidized processes of this type, a bed of ore is fluidized by upwardly flowing gases, e.g., carbon monoxide or hydrogen, or both, at temperatures below the bogging point of the ore. Typically, the process is staged, the ore being reduced initially from the ferric state to magnetite (magnetic oxide of iron); from magnetite to ferrous oxide; and finally from ferrous oxide to metallic iron.

In such processes, the oxides are quite readily converted to magnetite. This can be done at relatively mild temperature and short contact time. The reduction from magnetite to ferrous oxide is also accomplished with relative ease, this step requiring only more slightly rigorous conditions than in the former reduction. A major difficulty in all such processes is in connection with the reduction wherein ferrous oxide is reduced to metallic iron. To achieve maximum reduction at reasonable efficiency, high temperatures and gas of high reduction potential are necessary. Thus, the higher the reduction temperature and the greater the reducing power of the gas, the more economically and efficiently the ore can be reduced to the metallic state. Even under the best of conditions, however, it is rarely, if ever, possible to produce pure iron. This, in itself, may represent a significant technical achievement, even when it is highly desirable to reduce the ore to substantially pure iron. In most instances, the iron content of the ore is reduced to from about 60 to about 95 percent metallic iron, the residual portion of the products being substantially ferrous oxide or wustite.

The present invention has for its primary objective a method of increasing the iron values of wustite products, especially ferrous metal products produced in or obtained from direct iron ore reduction processes. In particular, its objective is to provide the art with a simplified, new and novel method wherein the iron values of such products can be readily increased above their initial metal content. A specific object is to provide a process combination which includes steps wherein oxidic iron ores, or precursors thereof, can be directly reduced to provide a wustite-containing metallized product, which product can then be subjected to relatively mild conditions to cause disproportionation of the wustite to increase the metallic iron content of the product.

The present invention is based on the discovery that the higher oxides of iron can be reduced to wustite which can be disproportionated under certain conditions to form metallic iron and magnetite. Hematite or magnetite, or mixtures and precursors thereof, can thus be reduced, in whole or in part, to wustite which can then be treated to cause disproportionation of the wustite to metallic iron and magnetite. The conditions of treatment required to disproportionate wustite are surprisingly mild and provide a simple method of increasing the iron values of metallic iron products produced in direct iron ore reduction processes.

The invention has particular utility with regard to the treatment of metallic iron products from direct iron ore reduction processes. Thus, oxidic iron ores, or precursors thereof, can be reduced to metallized products which contain wustite. The wustite-containing product can then be treated, generally under milder temperature conditions than required to form the wustite-containing product, to disproportionate the wustite and increase the free metal content of the product.

In a particularly preferred combination, reduction is carried out in a series of fluidized reduction stages at temperatures ranging from about 1000° F. to about 1800° F., and more preferably from about 1400° F. to about 1600° F., to provide a product which is from about 60 percent to about 95 percent metallized, the balance of the product consisting largely of wustite. Preferably, the product is from about 70 percent to about 90 percent metallized, and contains up to about 30 percent wustite. Disproportionation of the wustite within the product is carried out by subjecting the product to a mildly oxidizing, mildly reducing or preferably a nonoxidizing, non-reducing or substantially inert atmosphere.

Reduced iron product of desired wustite content can thus be withdrawn from a final reduction stage and, depending upon the temperature of withdrawal, can be heated or cooled in a mildly reducing, mildly oxidizing, or, preferably, a substantially inert atmosphere to produce disproportionation of the wustite. Disproportionation temperatures range generally from about 500° F. to about 1000° F., and preferably from about 650° F. to about 850° F.

The time required for completion of disproportionation varies considerably. The time required for disproportionation action of iron produced from nonspecular hematites differs, e.g., from products produced from specular hematites. In fact, quite surprisingly, products produced from specular hematite ores, which are far more difficult to reduce than nonspecular hematite ores, require far less time to disproportionate than those produced from non-specular hematites. For example, products obtained from non-specular hematites, with metallizations ranging from about 60 to about 95 weight percent, require periods ranging generally from about 60 minutes to about 1000 minutes, and preferably from about 120 minutes to about 800 minutes, to produce maximum iron by disproportionation. Similar products produced from specular hematites, require periods ranging from about 30 minutes to about 800 minutes, and preferably from about 40 minutes to about 500 minutes, to achieve maximum iron by disproportionation.

While applicants do not desire to be bound by theories on mechanism, it is believed that the results which have been achieved can be adquately explained, as follows:

It is known that iron can exist in several states of oxidation. It is capable of forming stoichiometric compounds of ferrous oxide (FeO or wustite), magnetic oxide or iron ($Fe_3O_4$ or magnetite) and ferric oxide ($Fe_2O_3$ or hematite). Such ideal states, however, are gross oversimplifications, for iron oxides are far more complex structures. Hematite, the highest valence state for elemental iron, is thus a chemical compound of the normal stoichimetric type. The compound satisfies a valence of three for iron and, of course, two for oxygen. Ferrous oxide, at least in theory, is a compound wherein iron has a valence of two. In reality, however, ferrous oxide has never been isolated in pure form and exists in theory at a temperature of about 1058° F. Above this temperature, the composition is approximated by a solution of ferrous oxide richer in oxygen than in FeO. These solutions, deficient in iron as contrasted with FeO, are known as wustite, i.e., $FeO_x$. The subscript or letter "x" in the formula $FeO_x$ is greater than 1.00 and ranges as high as about 1.2. Magnetite, on the other hand, is a compound of valence intermediate that of wustite and hematite. This compound, often represented by the formulas $Fe_3O_4$ or $Fe_2O_3 \cdot FeO$, exists at temperatures ranging below about 2000° F.

A unit cell of wustite contains 64 tetrahedral sites and 32 octahedral sites. It contains 32 oxygen anions and both $Fe^{+3}$ and $Fe^{+2}$ cations, in differing concentrations, as given in the table below:

WUSTITE

| X in FeO° | Weight percent Fe | Cations/unit cell | | Ratio $Fe^{2+}$/$Fe^{3+}$ per unit cell |
|---|---|---|---|---|
| | | $Fe^{3+}$ | $Fe^{2+}$ | |
| 1.00 | 77.7 | 0 | 32 | 32/0 |
| 1.03 | 77.2 | 2 | 29 | 29/2 |
| 1.07 | 76.6 | 4 | 26 | 26/4 |
| 1.10 | 76.0 | 6 | 23 | 23/6 |
| 1.14 | 75.3 | 8 | 20 | 20/8 |
| 1.19 | 74.6 | 10 | 17 | 17/10 |

The $Fe^{+3}$ and $Fe^{+2}$ cations are balanced to maintain electrical neutrality in the unit cell. Thus, wustite ranges from a structure containing 32 $Fe^{2+}$ cations ($FeO_{1.00}$) per unit cell to one containing only 17 $Fe^{2+}$ ($FeO_{1.19}$) cations per unit cell, and conversely from one containing no $Fe^{3+}$ cations ($FeO_{1.00}$) per unit cell to one containing 10 $Fe^{3+}$ cations ($FeO_{1.10}$) per unit cell.

In disproportionating, wustite first forms $Fe_3O_4$ using the $Fe^{+3}$ cation plus whatever $Fe^{+2}$ and $O^{-2}$ anions that are necessary to form $Fe_3O_4$. $FeO_{1.00}$ is also formed during this initial stage but not iron, i.e., $\alpha$-Fe, is formed. Finally, when all $Fe^{+3}$ cations initially present in the structure have been used to make $Fe_3O_4$, $FeO_{1.00}$ begins to disproportionate. The following schematic representation thus illustrates an initial "rearrangement" of $FeO_{1.14}$ to produce magnetite and "pure" wustite, $FeO_{1.00}$.

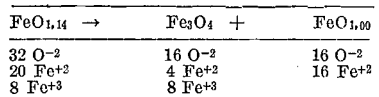

Following this, disproportionation of the $FeO_{1.00}$ takes place according to the equation given below:

$$4FeO \rightarrow Fe + Fe_3O_4$$

The invention will be better understood by reference to the following examples which bring out the more salient features.

The example immediately following shows the extent to which wustite can be disproportionated to produce metallic iron.

EXAMPLE 1

To produce wustite, natural nonspecular hematite ore is ground, dried and screened through 60 on 200 mesh screens (Tyler series). The ore is fluidized in a reactor and reduced by contact for sixty minutes with an ascending stream consisting of a gaseous mixture of 50 mole percent hydrogen and 50 mole percent steam. The reduction is carried out at 1350° F. at substantially atmospheric pressure to produce essentially pure wustite.

The product is stripped at the same temperature with dry, pre-purified nitrogen, providing a contact time of about 15 minutes to assure removal of hydrogen and water.

To initiate disproportionation, the product, while yet fluidized, is lowered in temperature to 750° F. by contact with essentially pure nitrogen. Individual runs are made, at different time periods, the products withdrawn from the bed at the end of the respective run, and the degree of disproportionation determined by Mossbauer spectrometry. Measurement is taken of the amount of magnetite and alpha iron within the treated product.

DISPROPORTIONATION OF $FeO_x$ AT 750° F.

| Run No.: | Disproportionation time, minutes | Weight percent, based on wustite | | $FeO_x$ X |
|---|---|---|---|---|
| | | $Fe_3O_4$ | $\alpha$-Fe | |
| 1 | 0 | 0 | 0 | 1.105 |
| 2 | 2 | 5 | 0 | 1.094 |
| 3 | 3 | 9 | 0 | 1.084 |
| 4 | 4 | 9 | 0 | 1.084 |
| 5 | 5 | 13 | 0 | 1.073 |
| 6 | 6 | 14 | 0 | 1.070 |
| 7 | 7 | 13 | 0 | 1.073 |
| 8 | 7.5 | 25 | 0 | 1.033 |
| 9 | 8 | 24 | 0 | 1.037 |
| 10 | 9 | 24 | 0 | 1.037 |
| 11 | 12 | 28 | 0 | 1.021 |
| 12 | 15 | 31 | 0 | 1.008 |
| 13 | 20 | 25 | 0 | 1.033 |
| 14 | 30 | 31 | 0 | 1.008 |
| 15 | 45 | 35 | 0 | 1.000 |
| 16 | 60 | 35 | 2 | 1.000 |
| 17 | 90 | 46 | 4 | 1.000 |
| 18 | 120 | 62 | 8 | 1.000 |
| 19 | 150 | 53 | 7 | 1.000 |
| 20 | 240 | 77 | 10 | 1.000 |
| 21 | 360 | 83 | 10 | 1.000 |
| 22 | 975 | 88 | 12 | 1.000 |

The table thus shows that about 45 minutes lapses before any alpha iron is formed. During the first 45 minutes, a rearrangement occurs wherein only $Fe_3O_4$ is produced from the wustite. From this time on, however, disproportionation of the $FeO_{1.00}$ occurs to produce metallic iron. The data thus show that at the end of about 975 minutes the metallic iron content of the product is 12 percent. Essentially all of the wustite is converted to magnetite and iron.

The following example further shows the effect of temperature in forming metallic iron. It also shows the relative ease in disproportionating a wustite product formed from a specular hematite. Specular hematites are quite difficult to reduce as contrasted with nonspecular hematites.

EXAMPLE 2

To form wustite, in a series of runs, various ores are charged into a reactor and contacted at 1350° F. for one hour with a mixture of reducing gas consisting of 50 mole percent hydrogen and 50 mole percent steam. The products obtained, which are virtually 100 percent wustite, are cooled within about 3 minutes to the temperature of disproportionation by contact with dry nitrogen, and held at disproportionation temperature for for-five minutes.

The following data points, taken by Mossbauer spectrometry, are obtained:

PERCENT WUSTITE REMAINING AFTER 45 MINUTES DISPROPORTIONATION

| Original ore type | At 400° F. | At 500° F. | At 600° F. | At 750° F. | At 1,000° F. | At 1,100° F. |
|---|---|---|---|---|---|---|
| A (specular) | 100 | 70 | 38 | 5 | 80 | 100 |
| B (specular) | | | | 30 | | |
| C (nonspecular) | | | | 45 | | |
| D (nonspecular) | | | 60 | 50 | 90+ | |
| E (nonspecular) | | | | 60 | | |
| F (nonspecular) | | | 60 | 65 | 90+ | |

EXAMPLE 3

Dry raw natural hematite ore is charged into the top of a reactor provided with a series of four stages, countercurrently contacted with a mixture of carbon monoxide and hydrogen in individual fluidized beds and reduced. The individual stages are operated at 1500° F. and 100 pounds per square inch pressure.

A particulate product, ninety percent metallized, is withdrawn from the final or bottom stage, and stripped with nitrogen in a separate fluidized bed.

The product is transferred to another vessel, contacted with nitrogen and cooled rapidly to 750° F. It is held at this temperature for forty-five minutes and then cooled rapidly to ambient temperature.

A portion of the product is analyzed by Mossbauer spectrometry and found to be 91.5 metallized. This represents a gain in metallization of 1.5 percent, based on the weight of the total product.

It is thus quite feasible to convert residual wustite to iron metal and magnetite, and with relative ease. It is also quite feasible to provide continuous production units for reducing iron to products containing residual amounts of wustite. The wustite can then be converted to metallic iron and magnetite by a mild heat treatment to provide additional iron values.

It will be apparent that various modifications and changes can be made without departing the spirit and scope of the invention.

Having described the invention, what is claimed is:

1. In a direct reduction process wherein oxidic iron ore is reduced by contact with reducing gases at temperatures ranging from about 1000° F. to about 1800° F. and subsequently cooled to ambient temperatures to provide a residual wustite containing reduced ore of from about 60 to about 95% metallization, the improvement comprising first lowering the temperature of said reduced ore from reduction temperatures to temperatures ranging from about 500° F. to about 1000° F., said lowering of the temperature being conducted in a substantially nonoxidizing, nonreducing atmosphere, to disproportionate residual wustite to metallic iron and magnetite, whereby the metallic iron content of said product is increased.

2. The process of claim 1 wherein the wustite containing reduced ore is lowered to temperatures ranging from about 650° F. to about 850° F.

3. In combination, the steps comprising contacting an oxidic iron ore with a reducing gas at temperatures ranging from about 1000° F. up to the sintering temperature of the ore to produce a product ranging from about 60 percent to about 95 percent metallic iron and containing residual wustite, and then treating the wustite-containing product with a substantially nonreducing, nonoxidizing gas at temperatures ranging from about 500° F. to about 100° F. to disproportionate the wustite to metallic iron and magnetite and thereby increase the iron values.

4. The process of claim 3 wherein both reduction and disproportionation are continuously carried out in a series of separate fluidized beds constituting stages of the process.

5. The process of claim 3 wherein the initially reduced product contains from about 10 percent to about 30 percent wustite.

6. The process of claim 3 wherein disproportionation is carried out at a temperature ranging from about 650° F. to about 850° F.

References Cited

UNITED STATES PATENTS

| | | | |
|---|---|---|---|
| 3,118,757 | 1/1964 | Peras | 75—1 |
| 3,338,704 | 8/1967 | Laurent et al. | 75—1 |

OTHER REFERENCES

Iron and Steel, Dec. 11, 1953, Iron Oxide, by J. O. Edstrom, pp. 612–616.

ALLEN B. CURTIS, Primary Examiner